(12) United States Patent
Mendonsa et al.

(10) Patent No.: US 10,037,779 B1
(45) Date of Patent: Jul. 31, 2018

(54) READ-AFTER-WRITE METHODOLOGY USING MULTIPLE ACTUATORS MOVEABLE OVER THE SAME MAGNETIC RECORDING DISK SURFACE

(71) Applicant: Seagate Technology LLC, Cupertino, CA (US)

(72) Inventors: Riyan Mendonsa, Minneapolis, MN (US); Jason Bryce Gadbois, Shakopee, MN (US); Mark Allen Gaertner, Vadnais Heights, MN (US); Guy T. Lawrence, Northfield, MN (US); Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/798,588

(22) Filed: Oct. 31, 2017

(51) Int. Cl.
*G11B 27/36* (2006.01)
*G11B 5/09* (2006.01)
*G11B 21/08* (2006.01)
*G11B 5/012* (2006.01)

(52) U.S. Cl.
CPC .............. *G11B 21/08* (2013.01); *G11B 5/012* (2013.01); *G11B 2220/20* (2013.01)

(58) Field of Classification Search
CPC ....... G11B 5/02; G11B 27/36; G11B 2220/20; G11B 20/18; G11B 5/6005; G11B 5/59633
USPC .......................................... 360/25, 31, 53, 75
See application file for complete search history.

(56) References Cited

U.S. PATENT DOCUMENTS

| | | |
|---|---|---|
| 5,983,485 A | 11/1999 | Misso |
| 6,356,404 B1 * | 3/2002 | Nguyen ............. G11B 5/012 360/46 |
| 7,199,981 B2 | 4/2007 | Zabtcioglu |
| 7,492,542 B2 | 2/2009 | van Zyl |
| 7,710,683 B2 | 5/2010 | Craig et al. |
| 9,142,246 B1 | 9/2015 | Trantham et al. |
| 9,361,919 B1 | 6/2016 | Lieu et al. |
| 9,449,618 B2 | 9/2016 | Rivkin et al. |
| 9,640,203 B1 | 5/2017 | Buch et al. |
| 2002/0039259 A1 | 4/2002 | Koyama et al. |
| 2012/0206830 A1 | 8/2012 | Gao et al. |
| 2012/0250177 A1 | 10/2012 | Somanache et al. |

* cited by examiner

*Primary Examiner* — Nabil Hindi
(74) *Attorney, Agent, or Firm* — Hollingsworth Davis, LLC

(57) ABSTRACT

One or more magnetic recording disks are coupled to a spindle motor, each of the disks having opposing recording surfaces. Two or more actuators are moveable independently over at least a first recording surface of the one or more disks. A first actuator of the two or more actuators comprises a first write head and a first read head. A second actuator of the two or more actuators comprises at least a second read head and may include a second write head. A controller is coupled to the two or more actuators and configured to write data to a track on the first recording surface using the first write head, and perform a read operation on the data written to the track using the second read head. The controller is also configured to verify that the data was successfully written to the track in response to the read operation. The read operation can be performed within less than one revolution of the first recording surface after the write operation.

20 Claims, 8 Drawing Sheets

READ-AFTER-WRITE METHODOLOGY USING MULTIPLE ACTUATORS MOVEABLE OVER THE SAME MAGNETIC RECORDING DISK SURFACE

SUMMARY

Embodiments are directed to an apparatus comprising one or more magnetic recording disks coupled to a spindle motor, each of the disks having opposing recording surfaces. Two or more actuators are moveable independently over at least a first recording surface of the one or more disks. A first actuator of the two or more actuators comprises a first write head and a first read head. A second actuator of the two or more actuators comprises a second write head and a second read head. A controller is coupled to the two or more actuators and configured to write data to a track on the first recording surface using the first write head, and perform a read operation on the data written to the track using the second read head. The controller is configured to verify that the data was successfully written to the track by the first write head in response to the read operation performed by the second read head. The controller can be configured to perform the read operation within less than one revolution of the first recording surface after the data is written to the track.

Other embodiments are directed to an apparatus comprising one or more magnetic recording disks coupled to a spindle motor, each of the disks having at least a first recording surface. First and second actuators are configured to independently move over at least the first recording surface of the one or more disks. The first actuator comprises a first write head and a first read head coupled to a first channel. The second actuator comprises a second write head and a second read head coupled to a second channel. A controller is coupled to the first and second channels and actuators. The controller is configured to write data to a track on the first recording surface using the first channel and first write head and, within less than one revolution of the first recording surface, perform a read operation on the data written to the track using the second channel and second read head. The controller is also configured to verify that the data was successfully written to the track in response to the read operation. In some embodiments, the one or more magnetic recording disks are configured for heat-assisted patterned dot magnetic recording (HDMR).

Further embodiments are directed to a method comprising independently moving two or more actuators over at least a first recording surface of one or more rotating magnetic recording disks. The two or more actuators comprise a first actuator that supports a first write head and a first read head and a second actuator that supports at least a second read head. The method comprises writing data to a track on the first recording surface using the first write head, and performing a read operation on the data written to the track using the second read head. The method also comprises verifying that the data was successfully written to the track by the first write head in response to the read operation performed by the second read head. In some embodiments, the read operation is performed within less than one revolution of the first recording surface after the data is written to the track.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to data storage devices that utilize magnetic storage media, e.g., hard disks. The storage capacity of hard disk drives (HDDs) has steadily increased due to the increase in areal density provided by such technological advances as perpendicular recording, shingled magnetic recording (SMR), heat-assisted magnetic recording (HAMR), interleaved magnetic recording (IMR), microwave-assisted magnetic recording (MAMR), helium filling, etc. This increase in HDD capacity, while reducing costs, can affect performance in some situations. For example, a conventional approach to verifying that a write operation has been completed successfully involves reading the written data after the disk has rotated by at least one complete revolution. The cumulative delay of waiting for one or more disk revolutions to read data after a write operation significantly reduces the overall performance of the HDD. With reductions in tolerances to increase areal density or when implementing HAMR, the need to verify the data as it is written continues to increase.

One way to address the need for greater HDD performance is to utilize multiple read/write heads in parallel. Such parallelism can increase the rate of input/output operations (IOPS) and thereby speed up certain operations. Use of simultaneously operating read/write heads can provide other options for a system designer in addition to an increase in TOPS. For example, an HDD can be configured with zones having different levels of throughput and capacity, and multiple heads can be operated in different modes to improve throughput in some zones while improving capacity (or other performance parameter) in others.

Overall performance of an HDD employing multiple read/write heads operating in parallel over the same magnetic recording disk surface can be increased by implementing a read-after-write methodology of the present disclosure. Presently, as discussed above, the time required to verify a write process entails at least another revolution of the disk. A read-after-write methodology of the present disclosure provides for reading after writing within less than one revolution following a write operation using multiple heads accessing the same disk surface. After reading the data, a verification process determines if the data was properly written to the disk.

In embodiments described below, a hard disk drive includes multiple heads driven by separate actuators (e.g., voice coil motors) that can read from and/or write to one or more disks simultaneously. Simultaneous active heads can be used to increase data rate or for other purposes (e.g., to increase reliability, service different requests in parallel, etc.). The multiple heads can access the same disk surface, and may be moved across the disk surface in a number of different ways. In one configuration, two or more actuators may be located at different locations around the disk, independently rotating about different axes. In some configurations, the actuators can be two-part actuators that include two arms (one above each disk surface) that independently rotate about a common axis.

In order to allow multiple head to simultaneously write to and read from the same disk surface, the signal processing circuitry of the drive may include parallel processing paths. For example, the processing circuitry may include multiple read/write channels for processing (e.g., decoding and/or encoding) user and control data. The processing circuitry may also include multiple servo control logic sections that allow data from each reader to be used for servo control of the head or heads in which the readers are embedded. This servo logic also provides timing signals used by the signal processing logic.

Provision of one or more additional actuators and readers independent of an existing actuator supporting a read/write head on a disk surface allows for increased utilization of a read-after-write process, which involves verifying that data was properly written to the disk surface. According to various embodiments, at least one actuator supports a writer and a reader relative to a disk surface, and at least one additional actuator supports a reader relative to the same disk surface. The additional actuator can support only the reader or both the reader and a writer. In some embodiments, at least one of the actuators can support multiple writers and multiple readers, and at least one additional actuator supports only multiple readers or both multiple readers and writers. In some embodiments, a read-after-write process is operable continuously. In other embodiments, a read-after-write process is implemented in response to a triggering event or condition.

Figure 1A:
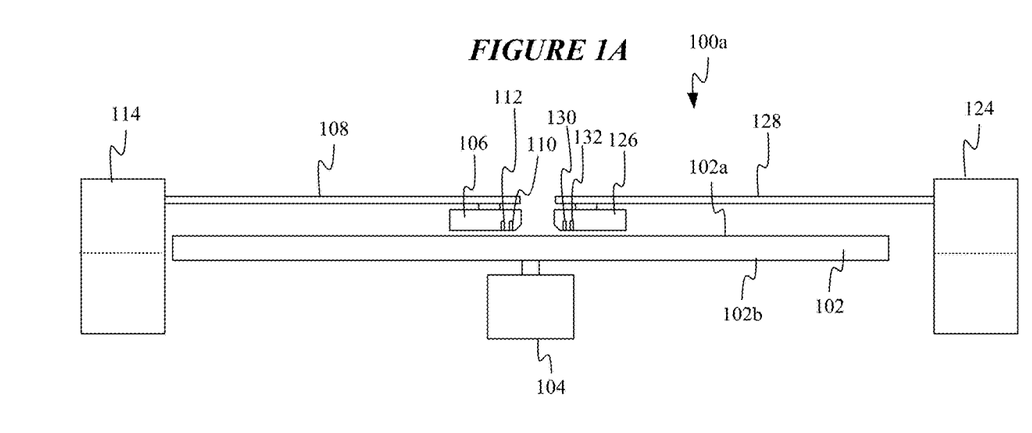
FIG. 1A is a diagram illustrating an apparatus for implementing a read-after-write process using multiple independent actuators moveable over the same magnetic recording disk surface according to a representative embodiment.

FIG. 1A is a diagram illustrating an apparatus for implementing a read-after-write process using multiple independent actuators moveable over the same magnetic recording disk surface according to a representative embodiment. The apparatus 100a includes at least one magnetic disk 102 driven by a spindle motor 104. A first slider 106 (also referred to as a head, read/write head, recording head, recording transducer etc.) is held over a first surface 102a of the disk 102 by an arm 108. An actuator 114 moves (e.g., rotates) the arm 108 to place the slider 106 over different tracks on the first surface 102a.

The first slider 106 includes a read transducer (reader) 110 and a write transducer (writer) 112. The reader 110 provides a signal in response to changing magnetic fields on the disk 102, and is coupled to a controller (not shown) where the separate signals are independently processed. The writer 112 receives signals from the controller and converts them to magnetic fields that change magnetic orientations of regions on the disk 102. In a HAMR implementation, the writer 112 may also include or be coupled to an energy source (e.g., laser diode) that creates a hotspot on a region of the disk 102 currently being recorded.

The apparatus 100a shown in FIG. 1A includes a second slider 126 supported by a second arm 128. The second slider 126 is held over the first surface 102a of the disk 102 by the second arm 128. A second actuator 124 causes the second arm 128 to move to different tracks on the first surface 102a. The actuators 114 and 124 move independently of one another, such that arms 108, 128 and sliders 106, 126 are respectively moved independently across the same disk surface 102a.

The second slider 126 includes a reader 130 and a writer 132. The first and second sliders 106 and 126 are capable of writing to and reading data from disk surface 102a simultaneously. The apparatus 100a can be configured to perform read-after-write operations in an independent mode, wherein the actuators 114 and 124 can be moved to perform write/read operations on the same disk surface 102a concurrently with and independently from one another. The actuators 114, 124 and sliders 106, 126 can be moved according to a scheduling algorithm implemented by the HDD controller to complete read-after writer operations within less than one revolution of the disk 102.

Figure 1B:
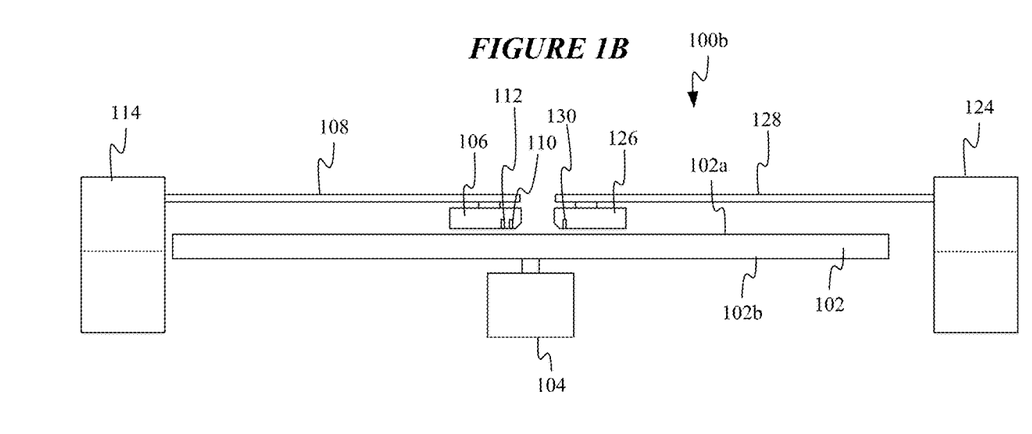
FIG. 1B is a diagram illustrating an apparatus for implementing a read-after-write process using multiple independent actuators moveable over the same magnetic recording disk surface according to a representative embodiment.

FIG. 1B is a diagram illustrating an apparatus 100b according to another representative embodiment. The apparatus 100b is largely the same as apparatus 100a shown in FIG. 1A. However, the second slider 126 in FIG. 1B includes only a reader 130 and excludes a writer. The apparatus 100b can be configured to perform read-after-write operations in a slaved mode, wherein the reader 130 of the second slider 126 is slaved to the writer 112 of the first slider 106. In the slaved mode, the reader 130 of the second slider 126 is moved to the same track where the writer 112 performs a write operation. When the writer 112 of the first slider 106 is moved to a different track, the reader 130 of the second slider 126 is moved to the same track in order to complete a read-after-write operation within less than one revolution of the disk 102.

In some embodiments, the actuators 114 and 124 shown in FIGS. 1A and 1B can be split actuators, such that each actuator 114 and 124 can support both upper and lower arms and sliders. In FIGS. 1A and 1B, only upper arms 108, 128 and upper sliders 106, 126 are shown. A corresponding set of lower arms and lower sliders can be coupled to lower actuators of split actuators 114 and 124. The lower arms may move together with corresponding upper arms, or the lower and corresponding upper arms can move independently. In either configuration, each pair of lower and upper arms rotate around the same axis. Independently movable heads that utilize a split actuator 114 and/or 124 may generally access different disk surfaces, e.g., heads accessing different disk surfaces 102a, 102b at the same time. Independently movable heads that utilize non-coaxial actuators 114, 124 may access the same disk surface at the same time, e.g., heads 106 and 126 may both access surface 102a at the same time. In the examples shown in FIGS. 1A and 1B, more than one disk 102 may be used, each of which is accessed by additional actuators and heads.

In the examples shown in FIGS. 1A and 1B, the disk 102 may be recorded with conventional tracks (e.g., separated by guard bands) or partially-overlaid adjacent tracks. Examples of the latter include shingled magnetic recording and interlaced magnetic recording. The readers may each be dedicated to a separate track and read just the separate track. In other cases, the two or more readers may overlap two or more tracks and/or have two or more readers reading at least part of the same track. The latter of these arrangements may be used in schemes such as multiple signal/sensor magnetic recording (MSMR) and two-dimensional magnetic recording (TDMR).

Figure 2:
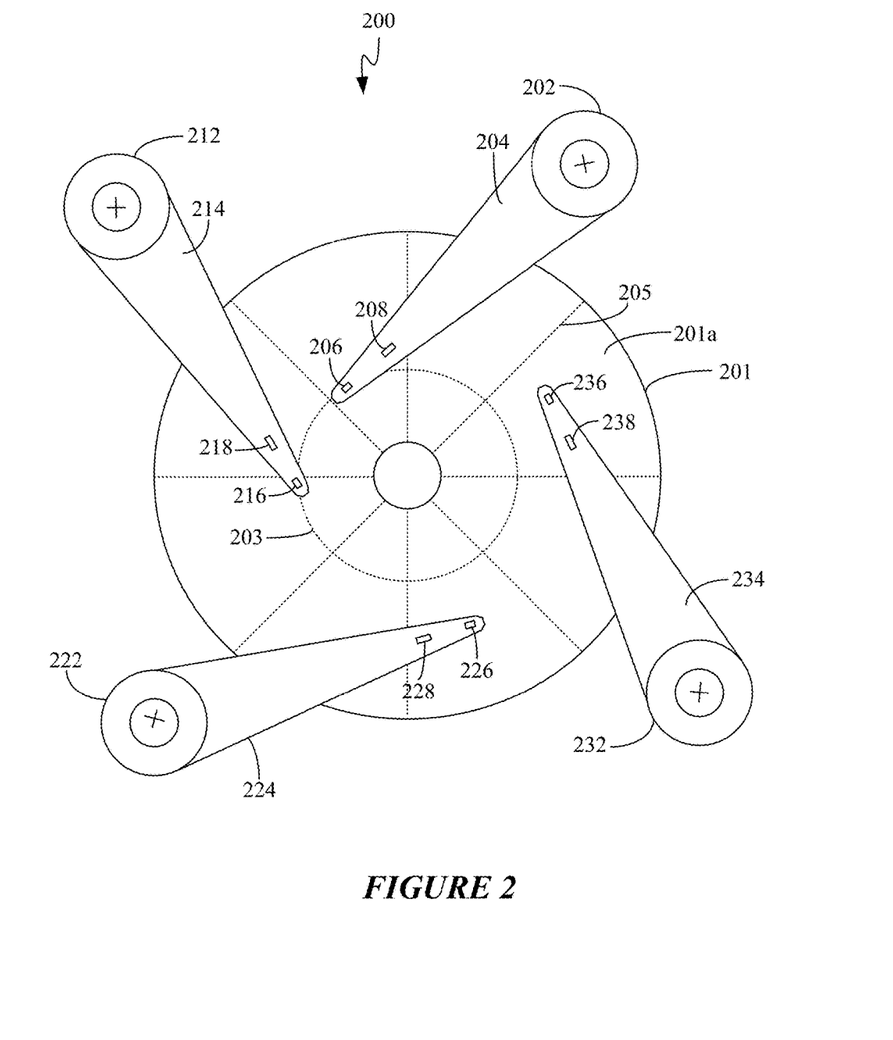
FIG. 2 is a diagram illustrating an apparatus for implementing a read-after-write process using multiple independent actuators moveable over the same magnetic recording disk surface according to a representative embodiment.

FIG. 2 is a diagram illustrating an apparatus 200 in accordance with another representative embodiment. The apparatus 200 includes more than two actuators for accessing the same disk surface. More particularly, the apparatus 200 includes four actuators 202, 212, 222, and 232. In some embodiments, the apparatus 200 can include three actuators rather than the four shown in FIG. 2. Actuator 202 includes arm 204 which supports a head 206 above a surface 201a of disk 201. The arm 204 can incorporate a microactuator 208 configured to provide fine movement of the head 206 after provision of course movement by the actuator 202. Actuator 212 includes arm 214 which supports a head 216 above the surface 201a of disk 201, and may incorporate a microactuator 218. Actuator 222 includes arm 224 which supports a head 226 above the surface 201a of disk 201, and may incorporate a microactuator 228. Actuator 232 includes arm 234 which supports a head 236 above the surface 201a of disk 201, and may incorporate a microactuator 238.

The apparatus 200 can be configured to perform read-after write operations within less than one disk revolution. For example, head 206 of actuator 202 can write data to track 203 of disk 201. If scheduling permits or if head 216 is slaved to head 206, head 216 of actuator 212 can read the data written by head 206 within about ¼ of a disk revolution. If head 216 of actuator 212 is not able to read the data written by head 206 in time, the data can be read by head 226 of actuator 222 within about ½ of a disk revolution. If head 226 of actuator 222 is not able to read the data written by head 206 in time, the data can be read by head 236 of actuator 232 within about ¾ of a disk revolution. In the context of FIG. 2, and as a general rule, an HDD can include N actuators, where N is an integer greater than two. A controller of the HDD can be configured to perform a read-after write operation within about 1/N of one revolution of the disk 201.

In some embodiments, each of the heads 206, 216, 226, 236 includes at least one reader and at least one writer. In such embodiments, the apparatus 200 can be configured to perform read-after write operations within less than one disk revolution in an independent mode (e.g., ¼, ½, or ¾ of a disk revolution depending on scheduling). In other embodiments, at least two of the heads 206, 216, 226, 236 include at least one reader and at least one writer, and the other two heads 206, 216, 226, 236 include at least one reader and either exclude a writer or include a non-operable writer. For example, heads 206 and 226 can each include at least one reader and at least one writer, and heads 216 and 236 can each include at least one reader and either exclude a writer or include a non-operable writer. In such embodiments, the apparatus 200 can be configured to perform read-after write operations within less than one disk revolution (e.g., about ¼ of a disk revolution) in a slaved mode.

Figure 3:
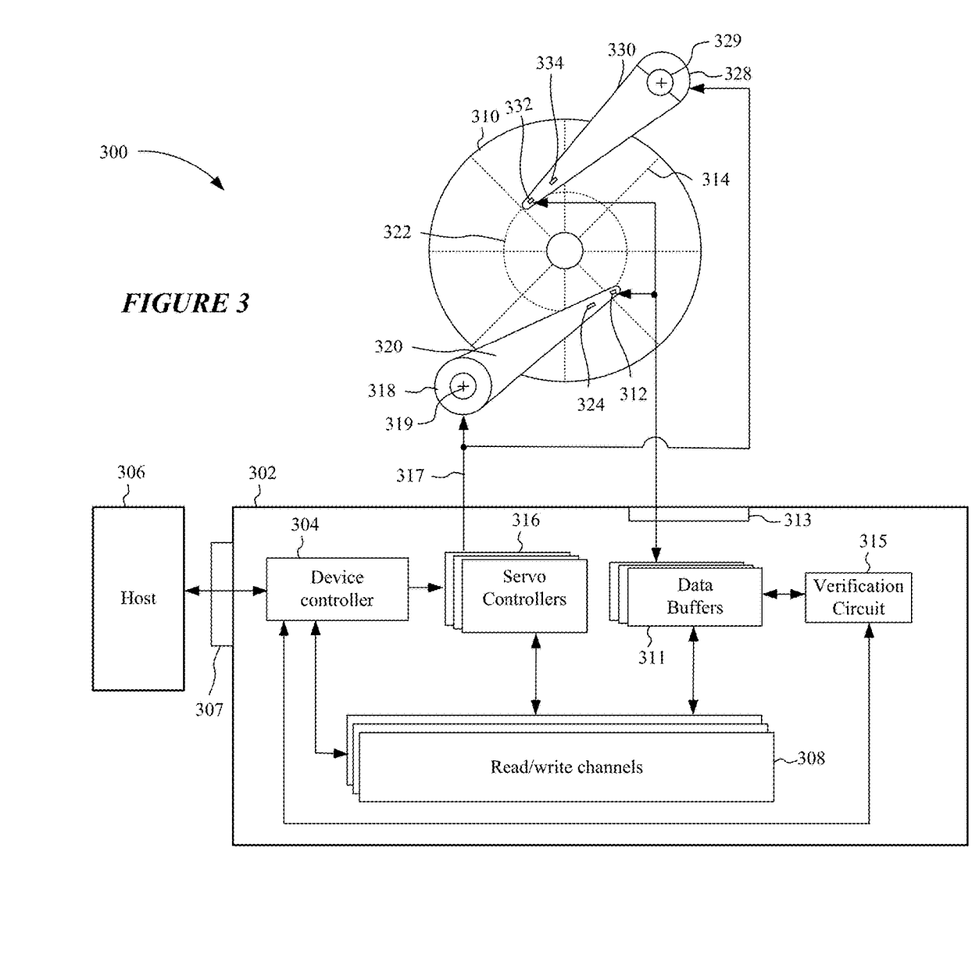
FIG. 3 is a diagram illustrating components of a hard disk drive apparatus that utilizes multiple independent actuators to implement a read-after-write process according to representative embodiments.

In FIG. 3, a diagram illustrates components of a hard disk drive apparatus 300 that utilizes multiple independent actuators according to representative embodiments. The apparatus 300 includes circuitry 302 such as a device controller 304 that processes read and write commands and associated data from a host device 306 via a host interface 307. The host interface 307 includes circuitry that enables electronic communications via standard bus protocols (e.g., SATA, SAS, PCI, etc.). The host device 306 may include any electronic device that can be communicatively coupled to store and retrieve data to/from a data storage device, e.g., a computer, a server, a storage controller. The device controller 304 is coupled to a multiplicity of read/write channels 308 that read from and write to surfaces of one or more magnetic disks 310.

The read/write channels 308 generally convert data between the digital signals processed by the device controller 304 and the analog signals conducted through two or more heads 312, 332 during read and write operations. The heads 312, 332 may each include respective readers capable of concurrently reading the disk 310, e.g., from the same surface. The readers may be configured to read in any mode, such as conventional single-track, conventional multi-track, MSMR, TDMR, SMR, IMR, etc. The heads 312, 332 may also include respective writers that can concurrently write to the disk 310. The writers may be configured to write using a HAMR energy source, and may write in various track configurations, such as conventional, SMR, and IMR. In some embodiments, one of the heads 312, 332 includes one or more readers and one or more writers, while the other of heads 312, 332 includes one or more readers only and no writers (or includes non-operable writers).

The read/write channels 308 may include analog and digital circuitry such as decoders, timing-recovery units, error correction units, etc. The read/write channels 308 are coupled to the heads 312, 332 via interface circuitry 313 that may include preamplifiers, filters, digital-to-analog converters, analog-to-digital converters, etc. As shown in FIG. 3, the read/write channels 308 are capable of concurrently processing one of a plurality of data streams from the multiple heads 312, 332.

In addition to processing user data, the read/write channels 308 read servo data from servo marks 314 on the magnetic disk 310 via the heads 312, 332. The servo data are sent to one or more servo controllers 316 that use the data to provide position control signals 317 to the actuators, as represented by voice coil motors (VCMs) 318 and 328. The VCM 318 rotates an arm 320 upon which head 312 is mounted in response to the control signals 317. The position control signals 317 may also be sent to microactuator 324 on arm 320 to finely control the position of head 312, e.g., causing small displacements of the head 312.

The VCM 318 may be a stacked or split actuator, in which case two VCM parts are configured to independently rotate different arms about a common axis 319. In such a case, another head (not shown) will access data on the opposite disk surface simultaneously with that of head 312, and this other head may be coupled to circuitry 302 in a manner similar to that of illustrated head 312. A second actuator, e.g., VCM 328, may independently and simultaneously rotate a second arm 330 about a second axis 329. Corresponding head 332 and microactuator 334 may be rotated by the VCM 328 and may operate simultaneously with the head 312 and microactuator 324 under commands from the one or more servo controllers 316.

The circuitry 302 can include a multiplicity of data buffers 311 each associated with one of the heads 312, 332. As part of a read-after-write operation, data to be written to track 322 by head 312, for example, is buffered in a data buffer 311. After writing to track 322 by head 312, head 332 is moved to track 322 and the data written by head 312 is read by head 332 within less than one revolution of disk 310 (e.g., about ½ of a disk revolution). The device controller 304 includes or is coupled to a verification circuit 315 that verifies that the data was properly written to track 322 by head 312. The verification circuit 315 can compare a writability metric, such as bit error rate (BER), of the written data to a threshold (e.g., a minimum BER) to determine if the data was properly written to track 322. If so, the data buffered in data buffer 311 is no longer needed and is released. If, on the other hand, the verification circuit 315 determines that the data was not properly written to track 322, a subsequent write operation is performed by rewriting the data stored in the buffer 311 to track 322.

A subsequent read-after-write operation is performed followed by another verification check by the verification circuit 315. This process can be repeated a predetermined number of times (e.g., 3-6 times) until the data is successfully written to track 322 or the verification circuit 315 indicates that data cannot be properly written to the target sectors of track 322. According to some embodiments, the sectors of track 322 that could not be successfully written to can be identified as non-recordable sectors. These sectors can be avoided for subsequent write operations. Sectors identified as spare sectors on the disk 310 can be allocated as working sectors for data storage at least equal in number to the non-recordable sectors.

Figure 4:
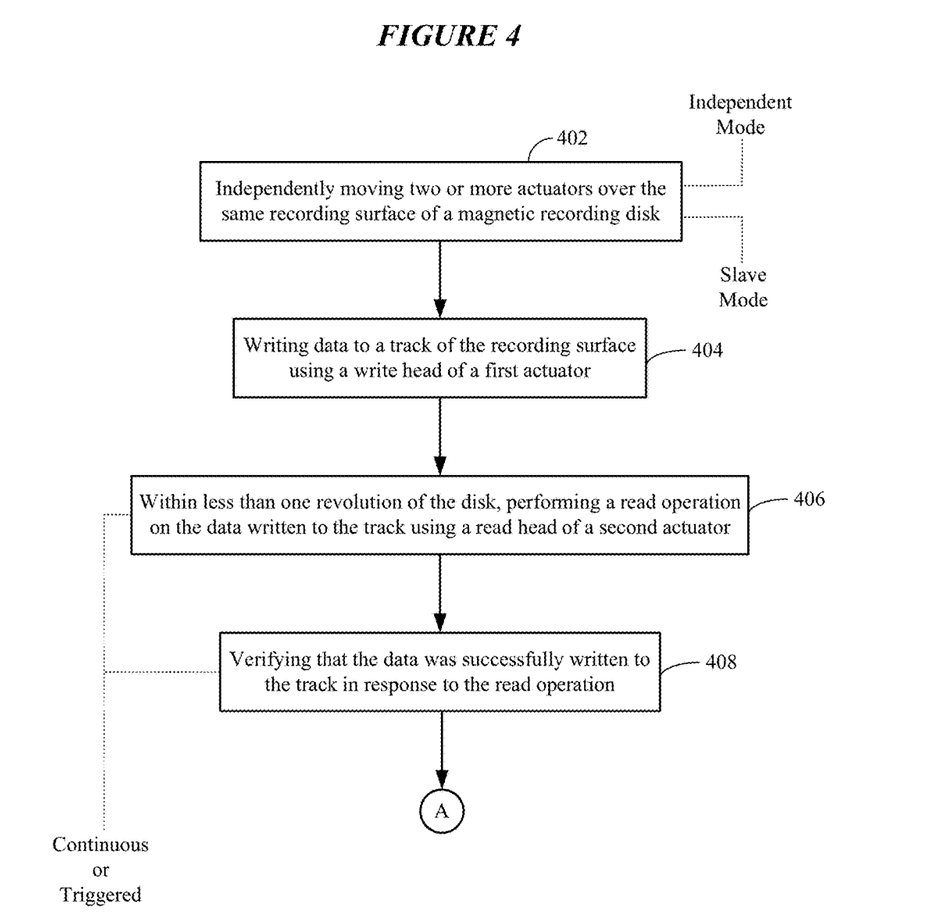
FIG. 4 illustrates a read-after-write method using multiple independent actuators moveable over the same magnetic recording disk surface in accordance with various embodiments.

FIG. 4 illustrates a read-after-write method using multiple independent actuators moveable over the same magnetic recording disk surface in accordance with various embodiments. The method shown in FIG. 4 involves independently moving 402 two or more actuators (e.g., 2, 3, or 4 actuators) over the same recording surface of a magnetic recording disk. In some embodiments, the actuators include both read and write transducers and operate in an independent mode. In the independent mode, each of the actuators is capable of performing read and write operations concurrently and independently relative to other actuators. In other embodiments, the actuators operate in a slaved mode in which at least one of the actuators includes only a read transducer (or multiple read transducers) and may exclude a write transducer or transducers. In the slaved mode, as previously discussed, an actuator incorporating only a read transducer is slaved to the writer of another actuator and tracks the movement of the writer.

The method of FIG. 4 involves writing 404 data to a track of the recording surface using a write head of a first actuator. After writing data to the track, the method involves performing a read operation 406 on the data written to the track using a read head of a second actuator. In some embodiments, the read operation 406 is performed within less than one revolution of the disk after the write operation 404. The method further involves verifying 408 that the data was successfully written to the track in response to the read operation. Blocks 406 and 408 of the read-after-write methodology shown in FIG. 4 can be implemented on a continuous or a triggered basis.

In some applications, it may be desirable for an HDD employing multiple actuators for the same disk surface to implement a read-after-write methodology on a continuous basis. In other applications, it may be desirable for a read-after-write process to be implemented on a triggered basis. For example, a read-after-write process can be implemented upon encountering a certain condition, such as a specified environmental condition (e.g., high temperature, high humidity, high altitude, high vibration/shock, where the condition exceeds a predetermined threshold). Presently, operation of an HDD slows down in response to detecting a high vibration event, which reduces throughput and performance of the HDD. Implementing a read-after-write process in response to a high vibration event avoids the need to slow down the operation of the HDD.

A read-after-write process can be implemented upon encountering a certain trigger responsive to an operating condition of the HDD. For example, a read-after-write process can be triggered in response to an excessively high fly height of a slider when performing a write operation, such as due to a vertically displaced write (VDW) event, also referred to as a skip write event. Another system event that can trigger a read-after-write process involves short duration mispositioning errors resulting in encroachment of neighboring tracks. For example, an off-track center deviation limit, referred to as an on-cylinder limit (OCLIM), can trigger a read-after-write process. Contact between the writer of a head and a media defect (e.g., a thermal asperity) of the recording the surface can trigger a read-after-write process. In the case of an HDD configured for HAMR, a laser mode hop can trigger a read-after-write process.

In some embodiments, a read-after-write process can be implemented only for certain heads or physical media locations. A read-after write process can be implemented on an opportunistic basis. For example, if there are multiple actuators that are idle or have available bandwidth, then these actuators may be used to implement read-after-write processes, thereby minimizing or eliminating performance impact. It is understood that a read-after-write process can be implemented in response to any of these events or condition or any combination of these events or conditions.

Figure 5:
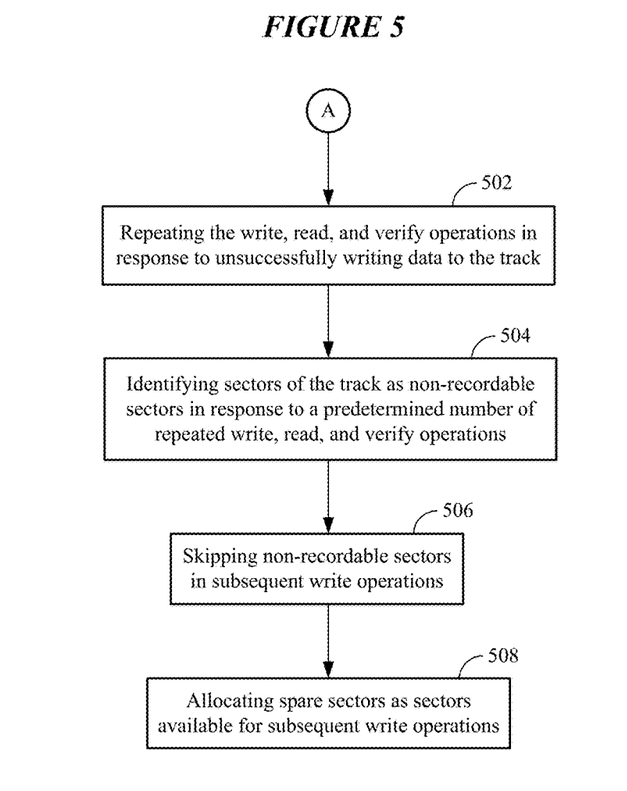
FIG. 5 illustrates additional processes of the read-after write method shown in FIG. 4 in accordance with some embodiments.

FIG. 5 illustrates additional processes of the read-after write method shown in FIG. 4 in accordance with some embodiments. The method shown in FIG. 5 involves repeating 502 the write, read, and verify operations in response to unsuccessfully writing data to the track. The method involves identifying 504 sectors of the track as non-recordable sectors in response to a predetermined number of repeated write, read, and verify operations. The method also involves skipping 506 non-recordable sectors in subsequent write operations, and allocating 508 spare sectors of the disk as sectors available for subsequent write operations.

Figure 6:
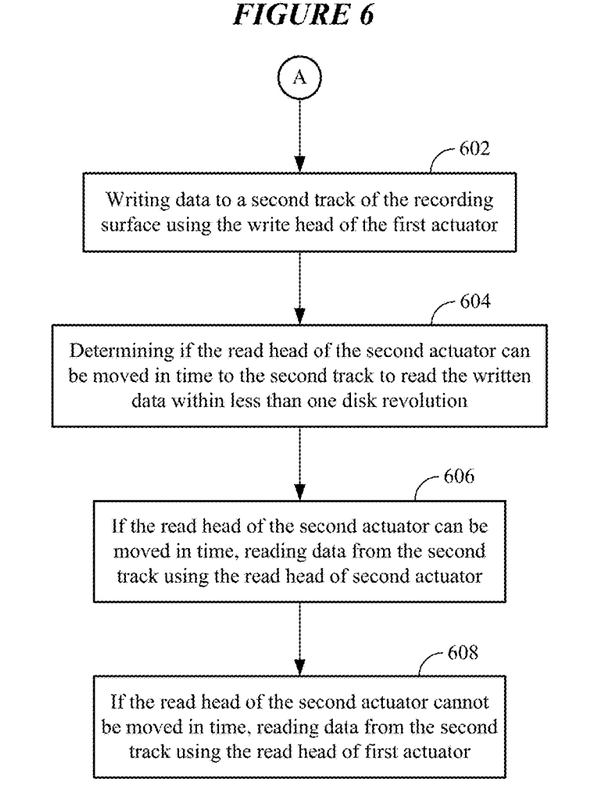
FIG. 6 illustrates additional processes of the read-after write method shown in FIG. 4 in accordance with some embodiments.

FIG. 6 illustrates additional processes of the read-after write method shown in FIG. 4 in accordance with other embodiments. The method shown in FIG. 6 involves writing data 602 to a second track of the recording surface using the write head of the first actuator. The method involves determining 604 if the read head of the second actuator can be moved in time to the second track to read the written data within less than one disk revolution. If the read head of the second actuator can be moved in time, the method involves reading 606 data from the second track using the read head of the second actuator. If the read head of the second actuator cannot be moved in time, the method involves reading data 608 from the second track using the read head of the first actuator, which involves at least one revolution of the recording surface.

Figure 7:
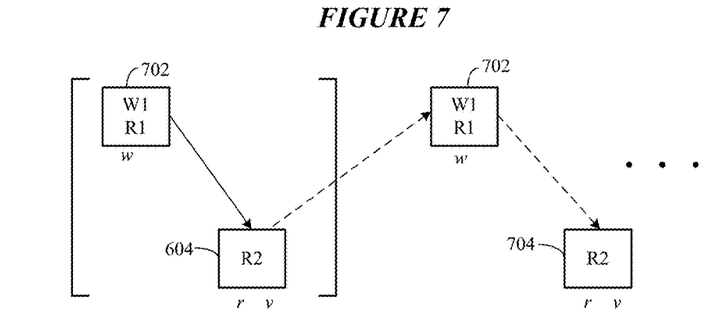
FIG. 7 illustrates a read-after-write process involving two actuators that are moved across the same disk surface when operating in a slaved mode in accordance with various embodiments.

FIG. 7 illustrates a read-after-write process involving two actuators 702 and 704 that are moved across the same disk surface when operating in a slaved mode in accordance with various embodiments. In FIG. 7, actuator 702 includes a writer, W1, and a reader, R1. Actuator 704 can include only a reader, R2, which is slaved to the writer, W1, of actuator 702. In some embodiments, actuator 704 can also include a writer, but actuator 704 is slaved to actuator 702 when performing a read-after-write operation. The controller of the HDD moves the writer, W1, of actuator 702 to a specified track of the recording surface. Data is written (w) to sectors of the specified track using the writer, W1. The controller moves the reader, R2, of actuator 704 to the specified track in time to read (r) the data written by the writer, W1, during the same revolution of the disk. Depending on the location of the writer, W1 of actuator 702 and reader, R2, of actuator 704, the data may be read by the reader, R2, within about one half of a revolution of the disk. The data read by the reader, R2, is verified (v) by the controller to determine if the data was properly written to the specified track by the writer, W1 (e.g., by comparing the BER of the written data to a threshold). The data is verified by the controller preferably within the same disk revolution.

The bracketed operations shown in FIG. 7 represent the core operations involving a single read-after-write process performed using actuator 702 and 704. If the controller determines that the writer, W1, did not properly write the data to the specified track, the read-after-write process is repeated in an attempt to properly write the data to the specified track. The read-after-write process can be repeated a predetermined number of times (e.g., at least 3 times). If the data cannot be written to the specified track after the predetermined number of times, these sectors of the specified track can be identified as non-recordable sectors and avoided during subsequent write operations.

It is noted that an actuator that supports a slider comprising only a reader and no writer provides for a reduction in cost and complexity of the actuator. Also, scrap sliders with poorly performing writers but functional readers can be used, which reduces cost through scrap mitigation.

Figure 8:
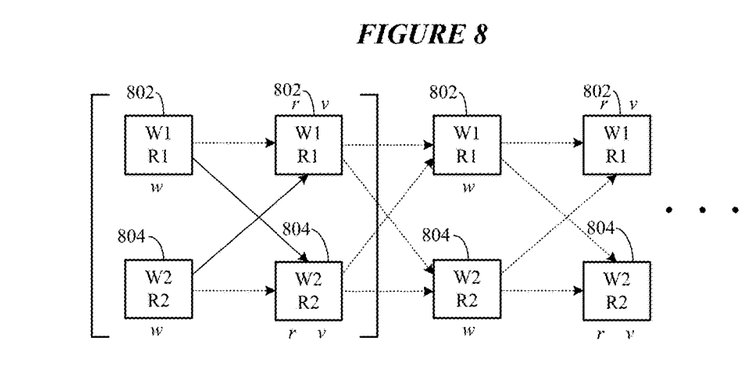
FIG. 8 illustrates a read-after-write process involving two actuators that are moved across the same disk surface when operating in an independent mode in accordance with various embodiments.

FIG. 8 illustrates a read-after-write process involving two actuators 802 and 804 that are moved across the same disk surface when operating in an independent mode in accordance with various embodiments. In FIG. 8, actuator 802 includes a writer, W1, and a reader, R2. Actuator 804 includes a writer, W2, and a reader, R2. In an independent mode of operation, actuator 802 can read and write data concurrently with and independently from actuator 804. As such, the scheduling algorithm implemented by the HDD controller is more complex when performing a read-after-write process involving actuators 802 and 804 operating in an independent mode.

In the illustrative example shown in FIG. 8, writers W1 and W2 can be writing data to the same disk surface at different times or concurrently. Concurrent writes by writers W1 and W2 can involve different durations of write time, but overlap in time at least partially. Ideally, the HDD controller schedules a write operation using writer W1 of actuator 802 so that the reader R2 of actuator 804 can be moved in time to read the data written by writer W1 within less than one disk revolution. This assumes that the writer W2 of actuator 804 completes its write operation early enough to allow the reader R2 to be moved to the track written by the writer W1. In addition, the HDD controller ideally schedules a write operation using the writer W2 of actuator 804 so that the reader R1 of actuator 802 can be moved in time to read the data written by the writer W2 within less than one disk revolution. This assumes that the writer W1 of actuator 802 completes its write operation early enough to allow the reader R1 to be moved to the track written by writer W2.

In some instances, it may not be possible to complete all read-after-write processes within less than one disk revolution depending on the location and duration of concurrent writes made by writers W1 and W2. For example, assume that writers W1 and W2 are performing concurrent writes to different tracks on the same recording surface. Depending on scheduling, it may not be possible to move reader R2 in time to read data written by writer W1 within less than one disk revolution. In this case, reader R1 can be used to read the data written by writer W1, which involves at least one disk revolution. Similarly, it may not be possible to move reader R1 in time to read data written by writer W2 within less than one disk revolution. In this case, reader R2 can be used to read the data written by writer W2. Although it is possible that some read-after-write processes cannot be completed within one disk revolution, many read-after-write processes can be completed within less than one disk revolution, resulting in a significant increase in throughput.

The read-after-write process of FIG. 8 can be repeated a predetermined number of times (e.g., at least 3 times). If the data cannot be written to the specified track after the predetermined number of times, these sectors of the specified track can be identified as non-recordable sectors and avoided during subsequent write operations.

In accordance with other embodiments, a HAMR drive is configured to implement a read-after-write methodology when writing and reading data to/from heat-assisted patterned dot magnetic recording (HDMR) media. HDMR media is also referred to as heat-assisted bit patterned media. HDMR is vulnerable to two problems that can silently corrupt write operations. The first problem involves position noise or mechanical disturbances that cause loss of write synchronization. The second problem involves laser mode hops that shift the phase needed for write synchronization. An immediate read-after-write (IRAW) procedure can overcome these vulnerabilities by checking every write operation, and evoking re-writes when needed.

HDMR media generally refers to magnetic data/information storage and retrieval media having a plurality of discrete, independent regions of magnetic material formed on a non-magnetic substrate. The magnetic regions form discrete, independent magnetic elements (e.g., islands) which function as recording bits. In HDMR media, the writing process does not define the location, shape, and magnetization value of a bit, but flips the magnetization orientation of an existing patterned single domain magnetic structure.

Figure 9:
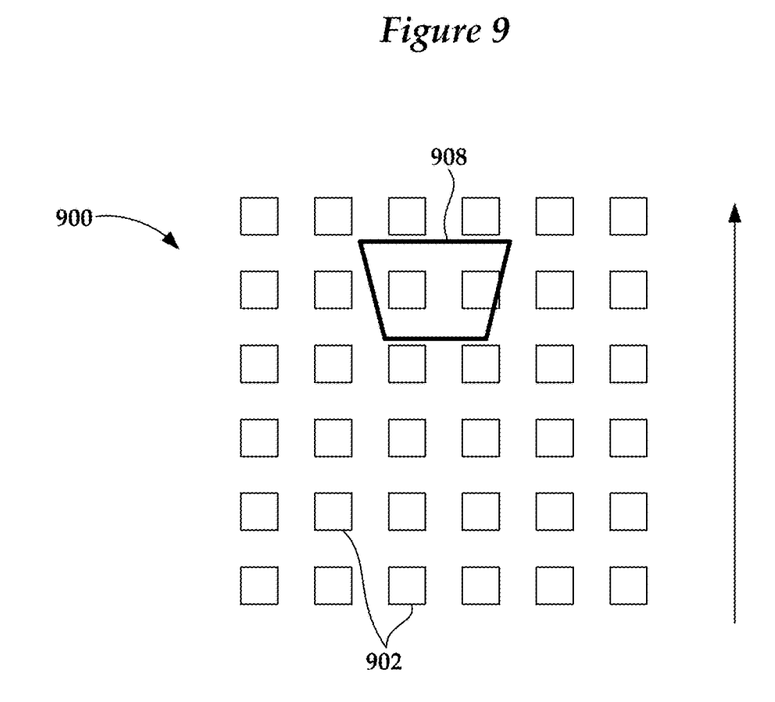
FIG. 9 shows a portion of a magnetic recording medium configured for HDMR.

Referring now to FIG. 9, a portion of an HDMR medium 900 is shown which includes an discrete recording bit pattern. The magnetic storage medium 900 supporting the discrete data bit pattern may include a non-magnetic substrate with an overlying magnetic recording layer with perpendicular anisotropy, along with one or more interlayers between the substrate and the magnetic layer according to various implementations. The magnetic layer may be patterned to form the discrete recording bits 902, through, for example, lithographic patterning or self-organizing nanoparticle arrays.

The discrete data bit pattern includes a multiplicity of discrete recording bits 902 arranged in a pattern. The discrete recording bits 902 can be arranged in a number of different patterns, including staggered and non-staggered patterns. In some embodiments, the discrete recording bits 902 have a generally rectangular or square shape. In other embodiments, the discrete recording bits 902 have a generally circular shape. The illustrated arrangement of bits 902 generally conforms to a polymer patterned media, which can include a pattern of evenly spaced bits 902. It is understood that other spacing configurations may be used to form a recording bit pattern on a magnetic storage medium, such as patterns having different minimum bit spacing along different directions. According to some embodiments, the recording bits 902 extend around the disk and may be divided into a multiplicity of data regions or arrays, such as two or more concentrically spaced data tracks arranged generally perpendicular to a radius of the disk. Also illustrated in FIG. 9 is a transducer 908 configured to read and/or write to the media 900.

As is discussed hereinabove, HDMR is vulnerable to two problems that can corrupt write operations. Regarding write synchronization vulnerability, recording on the discrete media islands of HDMR media requires precise synchronization of the write data signal to the stream of media islands transiting under the write transducer. Although a system of periodically-sampled timing fields (e.g., "iPLL fields") patterned into the media has been defined to implement this synchronization, anomalies such as excess patterning position noise or shock can defeat the system, resulting in written-in errors. Such errors are manifested as "hard" errors in discrete media, which are particularly problematic for LDPC data recovery. In the absence of any subsequent checks like IRAW, these errors go undetected until an attempt to read back the potentially unrecoverable data is made.

Regarding laser mode hopping, HAMR laser mode hops result in an abrupt change to the size of the thermal-assist bubble produced by the near-field transducer of the HAMR head. Since the trailing edge of the bubble defines the boundaries of bits written to the media, data written when a mode hop occurs results in an abrupt phase change in the write data stream issued to the media. Measures have been developed to detect mode hops during writing to determine whether the write operation needs to be re-issued. However, the efficacy of these measures is unclear. Also unclear is the ability to rely on such measures to obviate mode hops as a concern. Hence, it is desirable to implement a read recovery strategy for dealing with the effect of mode hops that were undetected during a write operation.

In continuous media recording, an abrupt phase change results in a fragment of a sector being recorded with its phase shifted relative to the data recorded before the mode hop. If the phase shift is large enough, the channel can lose phase-lock and fail to recover data following the phase discontinuity. Measures have been defined for continuous media to compensate for such shifts in re-read operations to facilitate data recovery. The impact of mode hops is more insidious for the discrete media islands of HDMR. Since data is only recorded when write data transitions are synchronized to media islands, a sudden shift in write phase does not result in a fragment of phase-shifted data, but instead can result in a fragment plagued with write errors sufficiently numerous to make the fragment unrecoverable by any measures.

In various implementations, HDMR will require less laser power than continuous HAMR. While this may reduce the frequency of mode hop occurrences, it will likely not eliminate them entirely. HDMR also provides for an increase in bit density over continuous HAMR. As linear density increases, the spatial change caused by mode hops corresponds to larger phase shifts relative to a bit.

Figure 10:
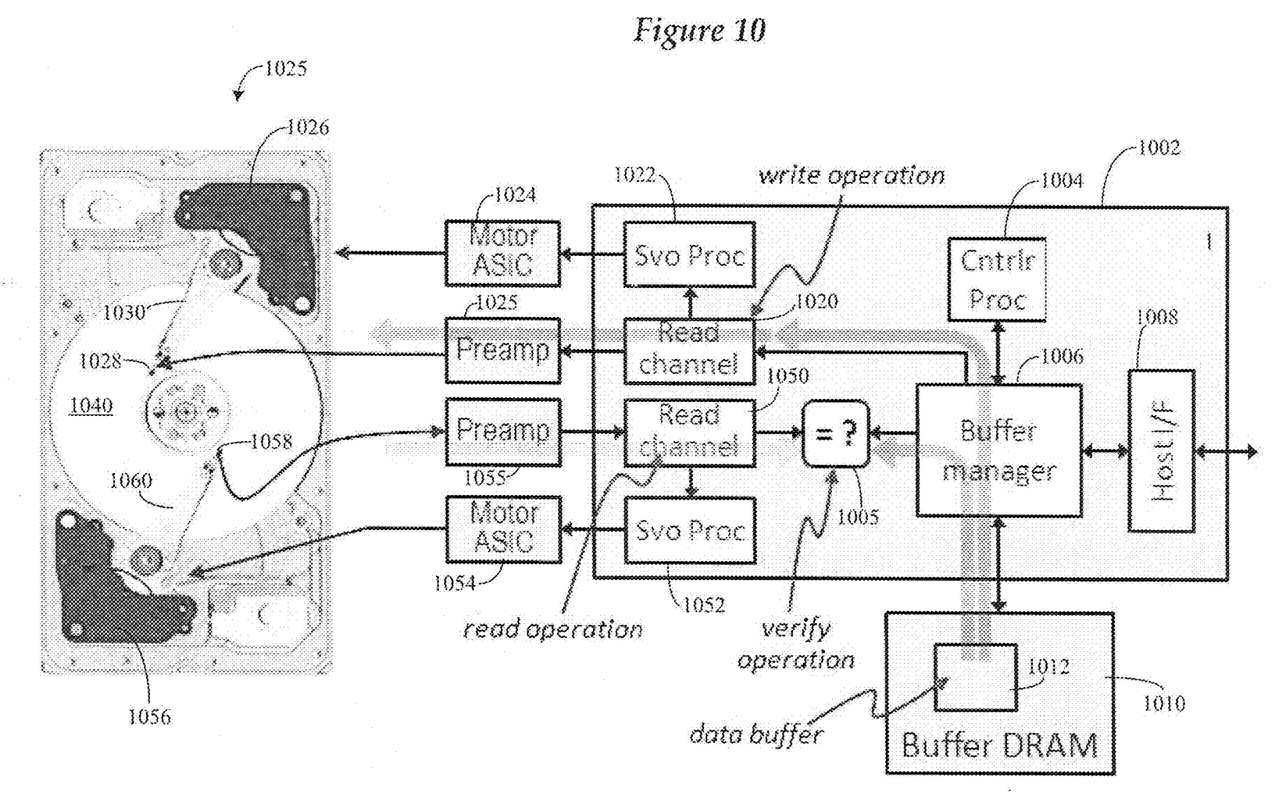
FIG. 10 illustrates components of an HDMR drive having dual independent actuators configured to implement an immediate read-after-write methodology in accordance with various embodiments.

FIG. 10 illustrates components of an HDMR drive having dual independent actuators configured to implement a read-after-write (e.g., IRAW) methodology in accordance with various embodiments. The HDMR drive 1025 shown in FIG. 10 includes a first head 1028 (read/write head) supported by a first actuator 1030 above a surface of an HDMR medium 1040. The HDMR drive 1025 also includes a second head 1058 (read/write head) supported by a second actuator 1060 above the surface of the HDMR medium 1040. The first head 1028 is pivotably positioned relative to the medium 1040 by a first VCM 1026. The second head 1058 is pivotably positioned relative to the medium 1040 by a second VCM 1056. The first and second VCMs 1026 and 1056 are positioned at opposing corners of the drive chassis in a so-called boxer configuration. It is understood that the HDMR drive 1025 shown in FIG. 10 can incorporate multiple HDMR mediums 1040 and multiple head/actuator/VCM arrangements associated with one or both surfaces of each of the mediums 1040.

Various electronics of the HDMR drive 1025 are shown in FIG. 10. In accordance with various embodiments, the HDMR drive 1025 includes a dual-channel system-on-chip (SOC) 1002 configured to implement an IRAW methodology. The dual-channel SOC 1002 supports a first channel 1020 and a second channel 1050. The first channel 1020 is coupled to a first servo processor 1022, an output of which is coupled to a first motor ASIC (application specific integrated circuit) 1024. The first motor ASIC 1024 is configured to convert digital servo control signals produced by the first servo processor 1022 to high-power analog signals for controlling the first VCM 1026. The first channel 1020 is also coupled to a first preamplifier 1025, which is coupled to the first head 1028. The first preamplifier 1025 includes circuitry for writing and reading data to/from the medium 1040 via the first head 1028.

The second channel 1050 is coupled to a second servo processor 1052, an output of which is coupled to a second motor ASIC 1054. The second motor ASIC 1054 is configured to convert digital servo control signals produced by the second servo processor 1052 to high-power analog signals for controlling the second VCM 1056. The second channel 1050 is also coupled to a second preamplifier 1055, which is coupled to the second head 1058. The second preamplifier 1055 includes circuitry for writing and reading data to/from the medium 1040 via the second head 1058.

The dual-channel SOC 1002 includes a buffer manager 1006 coupled to the first and second channels 1020 and 1050. The buffer manager 1006 is coupled to a controller (processor) 1004, a host interface 1008, and a buffer DRAM (dynamic random access memory) 1010. The buffer DRAM 1010 includes a data buffer 1012. The dual-channel SOC 1002 also includes a verification circuit 1005 coupled to second channel 1050. A verification circuit 1005 can be coupled between the buffer manager 1006 and each of the first and second channels 1020, 1050 in some embodiments. The host interface 1008 includes circuitry that enables electronic communications with a host device via standard bus protocols (e.g., SATA, SAS, PCI, etc.). The host device may include any electronic device that can be communicatively coupled to store and retrieve data to/from the HDMR drive 1025, e.g., a computer, a server, a storage controller.

While the illustrated dual-channel SOC 1002 is shown as a single unit (e.g., monolithic chip), similar functionality may be obtained by using two or more individual units. For example, in one embodiment, two or more single-channel SOCs may be assembled into a multi-chip package to achieve similar functionality described above in regards to the dual-channel SOC 1002. The two or more single-channel SOCs may be electrically connected and controlled by software/firmware to operate together as a monolithic unit. Such a multi-chip package may have some benefits, such as reducing single point of failure, reducing maximum temperatures by distributing processing circuitry, lower fabrication costs, etc.

FIG. 10 illustrates implementation of a read-after-write procedure in which a write operation is implemented by the first channel 1020 and an IRAW operation is implemented by the second channel 1050. With the boxer actuator configuration shown in FIG. 10, when the first actuator 1030/head 1028 is writing data to the medium 1040, the second actuator 1060/head 1058 can be independently positioned to read the written data as the medium 1040 comes around approximately a half of one revolution later. Subsequent write operations need not wait for the corresponding read-and-verify operation to begin, and instead the actuator/head being used for writing can immediately proceed to the track for the next scheduled write operation. It is noted that a conventional single-actuator IRAW operation incurs a severe write performance penalty by requiring that every write operation be followed by a micro-jog and read operation executed in a subsequent revolution. It is also noted that a single-channel SOC coupled to dual independent actuators cannot execute read operations to verify a write operation as a subsequent write operation proceeds.

Provision of dual channels 1020, 1050 enables concurrent read-verify and write operations to proceed as depicted in FIG. 10, where the first channel 1020 is executing a write operation and the second channel 1050 is executing a read operation to verify a previous write operation. The data buffer 1012 used for a write operation is released only after a read-verify implemented by the verification circuit 1005 is complete and successful. Implementing an HDMR IRAW methodology in the manner described above foregoes parallel write operations, although parallel read operations can be supported. However, high-density HDMR drives are particularly suited for achieving large volumes of data, where the lack of a parallel write capability may be well tolerated.

Embodiments of the disclosure can be implemented in a hard disk drive configured for MAMR. A MAMR drive can be configured to implement a read-after-write procedure in accordance with the embodiments disclosed hereinabove. In some embodiments, a MAMR drive can be configured to write to and read from a recording medium configured for microwave-assisted magnetic dot recording, akin to the medium shown in FIG. 9. A MAMR drive that incorporates a read-after-write capability can be implemented to include features disclosed in commonly owned U.S. Pat. Nos. 9,449,618 and 9,640,203, which are incorporated herein by reference.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus, comprising:
one or more magnetic recording disks coupled to a spindle motor, each of the disks having opposing recording surfaces;
two or more actuators that independently move over at least a first recording surface of the one or more disks;
a first actuator of the two or more actuators comprising a first write head and a first read head;
a second actuator of the two or more actuators comprising at least a second read head; and
a controller coupled to the two or more actuators and configured to:
write data to a track on the first recording surface using the first write head;
perform a read operation on the data written to the track using the second read head; and
verify that the data was successfully written to the track by the first write head in response to the read operation performed by the second read head.

2. The apparatus of claim 1, wherein the controller is configured to perform the read operation within less than one revolution of the first recording surface after the data is written to the track.

3. The apparatus of claim 1, wherein the controller is configured to perform the read operation within about half of one revolution of the first recording surface after the data is written to the track.

4. The apparatus of claim 1, wherein:
the two or more actuators comprise more N actuators, where N is an integer greater than two; and
the controller is configured to perform the read operation within about 1/N of one revolution of the first recording surface after the data is written to the track.

5. The apparatus of claim 1, wherein the controller is configured to:
move the first write head to each of a plurality of tracks to perform a plurality of write operations; and
for each of the write operations, move the second read head to a same track being written to by the first write head.

6. The apparatus of claim 1, wherein the controller is configured to:
perform a plurality of write operations to the first recording surface; and
read and verify the data written to the first recording surface after each of the write operations.

7. The apparatus of claim 1, wherein the controller is configured to:
perform a plurality of write operations to the first recording surface; and
read and verify the data written to the first recording surface in response to a predetermined event or condition.

8. The apparatus of claim 1, wherein the controller is configured to repeat the write, read, and verify operations in response to unsuccessfully writing the data to the track.

9. The apparatus of claim 1, wherein the controller is configured to identify sectors of the track as non-recordable sectors in response to unsuccessfully writing the data to the track after a predetermined number of attempts.

10. The apparatus of claim 1, wherein the controller is further configured to:

write data to a second track of the first recording surface using the first write head;

perform a read operation on the data written to the second track using the second read head if the controller determines the read operation using the second read head can be performed within less than one revolution of the first recording surface; and perform a read operation on the data written to the second track using the first read head if the controller determines the read operation using the second read head cannot be performed within less than one revolution of the first recording surface.

11. The apparatus of claim 1, wherein the second actuator comprises the second read head and a second write head.

12. The apparatus of claim 1, wherein the second actuator is either devoid of a second write head or comprises a non-operable second write head.

13. An apparatus, comprising:
one or more magnetic recording disks coupled to a spindle motor, each of the disks having at least a first recording surface;
first and second actuators that independently move over at least the first recording surface of the one or more disks;
the first actuator comprising a first write head and a first read head coupled to a first channel;
the second actuator comprising a second write head and a second read head coupled to a second channel; and
a controller coupled to the first and second channels and actuators, the controller configured to:
write data to a track on the first recording surface using the first channel and first write head;
within less than one revolution of the first recording surface, perform a read operation on the data written to the track using the second channel and second read head; and
verify that the data was successfully written to the track in response to the read operation.

14. The apparatus of claim 13, wherein the one or more disks are configured for heat-assisted patterned dot magnetic recording (HDMR).

15. The apparatus of claim 13, wherein the controller is configured to perform the read operation within about half of one revolution of the first recording surface after the data is written to the track.

16. The apparatus of claim 13, comprising a verification circuit coupled to the controller and one or both of the first and second channels, the verification circuit configured to verify that the data was successfully written to the track.

17. The apparatus of claim 16, comprising a data buffer configured to store the data to be written to the track, wherein the controller is configured to release the data buffer in response to the verification circuit verifying that the data was successfully written to the track.

18. A method, comprising:
independently moving two or more actuators over at least a first recording surface of one or more rotating magnetic recording disks, the two or more actuators comprising a first actuator supporting a first write head and a first read head and a second actuator supporting at least a second read head;
writing data to a track on the first recording surface using the first write head;
performing a read operation on the data written to the track using the second read head; and
verifying that the data was successfully written to the track by the first write head in response to the read operation performed by the second read head.

19. The method of claim 18, wherein the read operation is performed within less than one revolution of the first recording surface after the data is written to the track.

20. The method of claim 19, wherein:
the two or more actuators comprise N actuators, where N is an integer greater than two; and
the read operation is performed within about 1/N of one revolution of the first recording surface.

\* \* \* \* \*